United States Patent

Itsuzaki et al.

[11] Patent Number: 5,930,406
[45] Date of Patent: *Jul. 27, 1999

[54] POSITION DETECTION APPARATUS

[75] Inventors: Yoshihiro Itsuzaki, Kashihara; Kinji Horikami, Suita; Masaya Nakao, Moriguchi; Misuzu Takano, Hirakata, all of Japan

[73] Assignee: Matsushita Electric Insustrial Co., Ltd., Osaka-fu, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/392,214

[22] Filed: Feb. 22, 1995

[30] Foreign Application Priority Data

Feb. 23, 1994 [JP] Japan ................................ 6-025150

[51] Int. Cl.$^6$ ........................... G06K 9/00; G06K 9/36
[52] U.S. Cl. ..................... 382/291; 382/145; 382/152
[58] Field of Search ................................ 382/291, 141, 382/142, 143, 144, 145, 147, 148, 152, 153, 288, 287, 295, 203, 199; 356/4.08, 139.07, 141.1, 150, 255; 348/87, 94

[56] References Cited

U.S. PATENT DOCUMENTS 4,823,394 4/1989 Berkin et al. ........................ 382/145
5,040,225 8/1991 Gouge ................................ 382/128

FOREIGN PATENT DOCUMENTS 6-243253 9/1994 Japan ........................ G06F 15/70

OTHER PUBLICATIONS

"Optics" Francis Weston Sears, 3rd ed. Addison–Wesley (Apr. 1956) pp. 331–332, 334–335.

Primary Examiner—Thomas D. Lee
Assistant Examiner—Wenpeng Chen
Attorney, Agent, or Firm—Wenderoth, Lind & Ponack, L.L.P.

[57] ABSTRACT

A position detection apparatus for detecting a position of an object includes a video image producer which produces a video image signal representing the object image. The video image signal is divided into first and second level portions by an edge point. An edge point detector detects the edge point where said level difference is greater than a threshold level. A window filter is provided to increase this level difference to a level greater than a threshold so that the edge point detector can detect the edge point even when the level difference is smaller than the threshold level. A shape detector detects the position of the object based on thus detected edge point.

3 Claims, 7 Drawing Sheets

POSITION DETECTION APPARATUS

BACKGROUND OF THE INVENTION

1. Field of the Invention

The present invention relates to a position detection apparatus used in the assembly process of a factory manufacturing line for visual recognition processing of image data obtained from a target object by an imaging means, and recognizing such primary features of the target object as shape, position, and attitude for use in such processes as pass/fail quality determination and positioning for equipment operation. The present invention is especially suitable for detecting a position of target object under a poor condition for an image recognition method where there is no or poor contrast in the image obtained.

2. Description of the Prior Art

Various position detection principles have been applied according to the application and shape of the target object in conventional position detection apparatuses. A conventional position detection apparatus using the position detection principle is described below with reference to FIG. 13.

Figure 13:
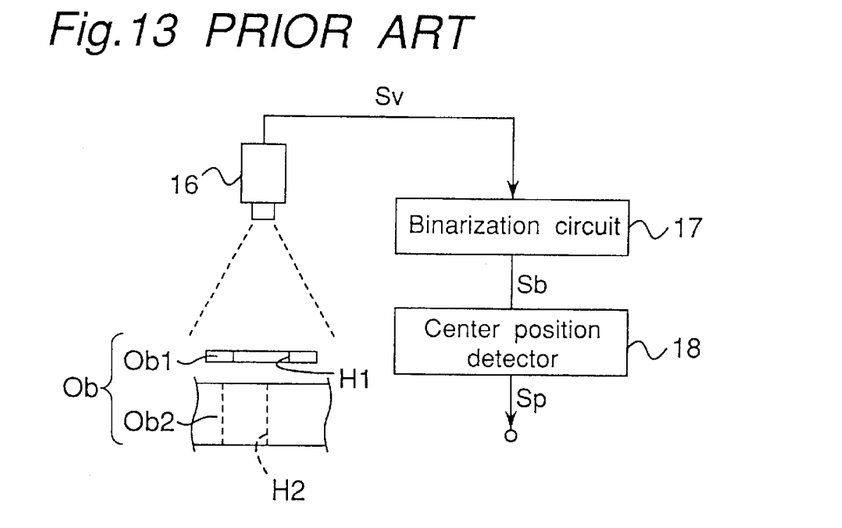
FIG. 13 is a block diagram showing an example of conventional shape detection apparatus.

In FIG. 13, one example of conventional position detection apparatuses is shown. This position detection apparatus detects the center position of a circular subject. An image pickup device 16 captures an image of objects Ob including first and second object members Ob1 and Ob2 provided with first and second holes H1 and H2 formed therein, respectively. The second object member Ob2 is placed under the first object member Ob1, and is exposed to the image pickup device 16 through the first hole H1. The image pickup device 16 outputs an image density data Sv representing the object image as the difference of density at each of the pixels. The binarization circuit 17 binaries the image data Sv to produce a binary data Sb. The center position detector 18 detects a clustered region indicative of first and second objects Ob1 and Ob2, respectively, based on the binary data Sb, and calculates a center position of the target object Ob2. Based on the thus calculated center position of the target object Ob2, a position of the entire object Ob1 can be detected accurately.

Figure 12:
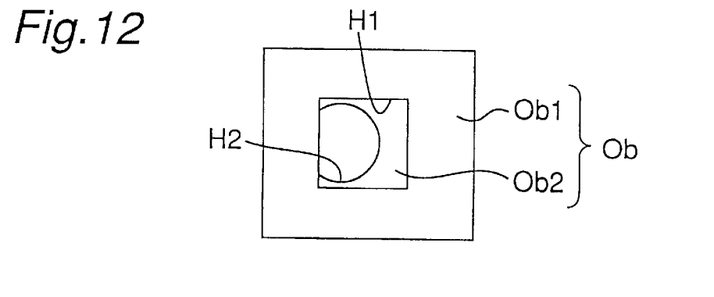
FIG. 12 is a top view of the object Ob, wherein a target hole H2 formed in the second object member Ob1 is shown through a square hole H1 formed in the second object.

However, when the second hole H2 partially hidden by the first object Ob1, as best shown in FIG. 12, is the target to detect, the center position of the target hole H2 is detected based on the image thereof only shown inside the first hole H1. Therefore, the thus detected center position is not a true center of the target hole H1. Furthermore, where there is no or poor contrast in image brightness between the areas indicating the target hole H2 and the first object Ob1, both areas are clustered into a signal area, disabling to distinguish the target hole H2 and it's background area representing the first object Ob1.

SUMMARY OF THE INVENTION

The present invention has been developed with a view to substantially solving the above described disadvantages and has for its essential object to provide an improved position detection apparatus.

In order to achieve the aforementioned objects, a position detection apparatus for detecting a position of an object comprises an image signal producing means for producing an image signal indicative of an image of the object, said image signal having an edge point by which the image signal is divided into first and second level portions having a level difference therebetween; an edge point detecting means for detecting the edge point where the level difference is greater than a predetermined level; an enhancing means for enhancing the image signal by increasing the level difference to a value greater than the predetermined level so that said edge point detecting means can detect said edge point even when the level difference is smaller than the predetermined level; and a position detecting means for detecting the position of the object based on the detected edge point.

BRIEF DESCRIPTION OF THE DRAWINGS

These and other objects and features of the present invention will become clear from the following description taken in conjunction with the preferred embodiment thereof with reference to the accompanying drawings throughout which like parts are designated by like reference numerals, and in which.

DETAILED DESCRIPTION OF THE PREFERRED EMBODIMENT

Figure 1:
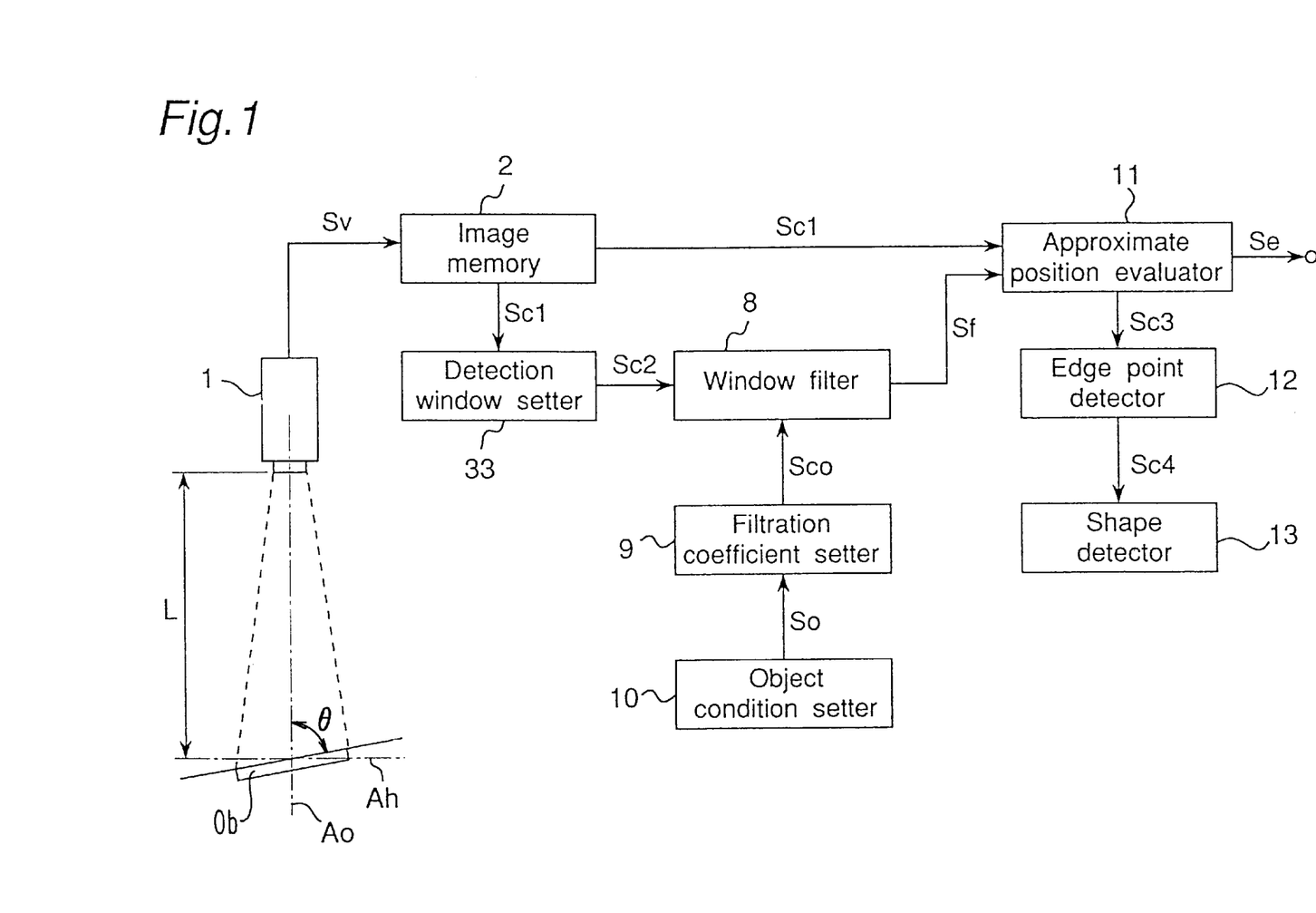
FIG. 1 is a block diagram showing a position detection apparatus according to the present invention.

Referring to FIG. 1, a position detection apparatus according to the present invention used for the detection of a position of an object Ob is shown. The position detection apparatus includes a video image producer 1, an image memory 2, a detection window setter 33, a window filter 8, filtration coefficient setter 9, an object condition setter 10, an approximate position evaluator 11, edge point detector 12, and shape detector 13.

The video image producer 1 is comprised of a television camera or similar visual sensors having an optical axis Ao, and captures an image of the object Ob of which the position is to be detected. The video image producer 1 digitizes the resulting image data and outputs it as a video signal Sv representing the object image as image density or brightness. The image memory 2 stores the video signal Sv.

The detection window setter 33 is connected to the image memory 2 for receiving a first position signal Sc1, including coordinate data of the target image, therefrom. The detection window setter 33 is an input/output device such as a light pen system by which the operator can set a detection window Dw matching the shape of the target image by designating points on the screen surface thereof with a light pen. At the same time, a plurality of line windows Lw placed intersecting the outside edge of the circular window Dw for density difference detection are also set. Then, the detection window setter produces and outputs a second position signal Sc2 including the coordinate data of the thus set detection window Dw and line windows Lw to the window filter 8.

The approximate position evaluator 11 is connected to the image memory 2 and the window filter 8 for receiving the signals Sc1 and Sf, respectively, to scan the image data (the first position signal Sc1) by a means of the detection window Dw (the second position signal Sc2) with the calibrated line windows Lw. Thus, the approximate position evaluator 11 detects the position at which the detection window Dw matches the target image, and outputs a third position data signal Sc3 including coordinate data of the detected object.

Figure 8:
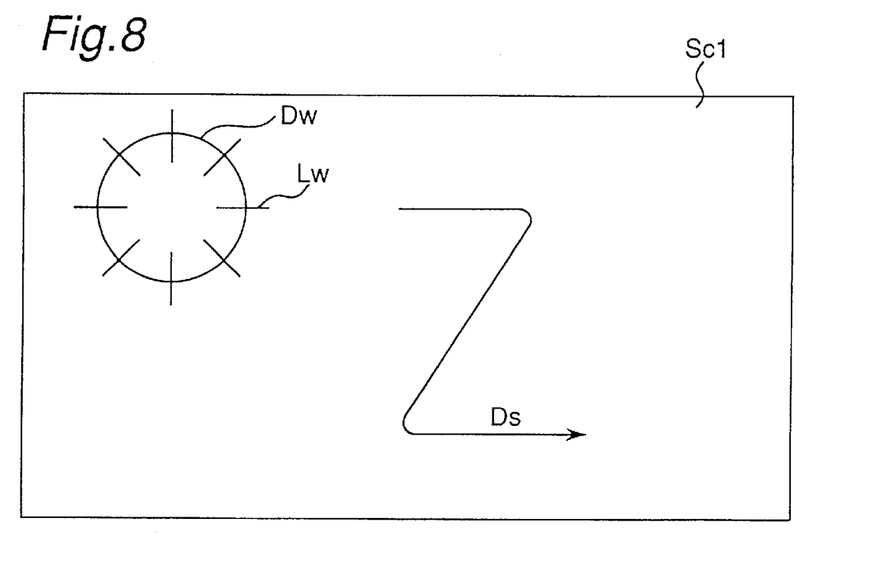
FIG. 8 is an illustration in assistance of explaining a position detection method using a circular detection window according to the present invention.
Figure 9:
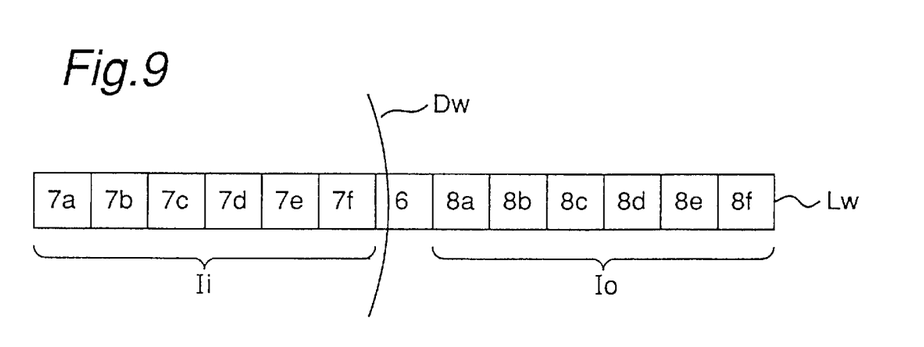
FIG. 9 is an illustration in assistance of explaining the radial sampling line windows according to the present invention.
Figure 10:
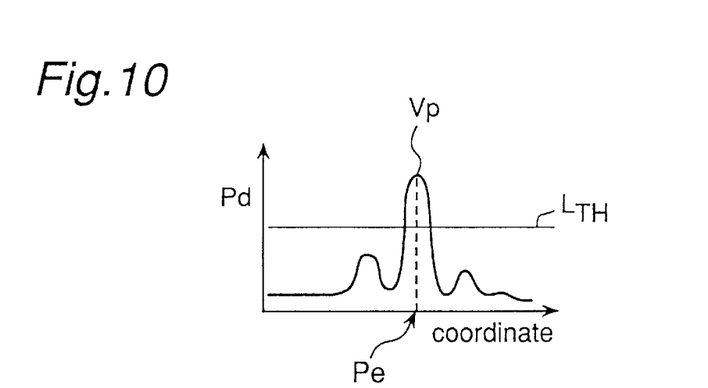
FIG. 10 is an illustration in assistance of explaining the edge point detection according to the present invention.

With reference to FIGS. 8, 9, and 10, the principle of position detection according to the present invention is described. The detection window Dw is a contour line-shaped window of which the shape and size conform to at least a part of the contour line of the target object image. As shown in FIG. 8, when the target is formed in a circular shape, for example, the circular shaped detection window Dw is set. A plurality of line windows Lw used for density difference detection are placed intersecting the outside edge of the circular window Dw, as best shown in FIG. 8. The first position signal Sc1 is scanned with detection windows Dw and Lw to detect to the position where the circular window Dw matches the target image.

In FIG. 9, one of the line windows Lw is shown. Each line window Lw is comprised of, for example, thirteen density detection cells 7a, 7b, 7c, 7d, 7e, 7f, 6, 8a, 8b, 8c, 8d, 8e, and 8f which are arranged in order from the inside to the outside so as to intersect the detection windows Dw at the middle cell 6. The line window Lw is thus able to detect an inside image density Ii by the cells 7a, 7b, 7c, 7d, 7e, and 7f and an outside image density Io by the cells 8a, 8b, 8c, 8d, 8e, and 8f in the area of inside and outside thereof, respectively.

In FIG. 10, the first differential value Pd of the image data Sc1 at each cell of line window Lw is schematically shown. The first differential Pd preferably shows a peak density Vp greater than a predetermined threshold level $L_{TH}$ at position Pe, corresponding to the middle cell 6, which is detected as an edge point.

Referring back to FIG. 1, the object ob is placed on the visual sensor side away from the video image producer 1 by a predetermined distance L with its main plane at a right angle with respect to the optical axis Ao so that the video image producer 1 can capture the video image of the object Ob with an even contrast in the image brightness. However, the object Ob is actually tilting by a tilting angle θ with respect to the optical axis Ao. The distance L also may vary. According to the changes of the titling angle θ and the distance L, the image contrast F which is the contrast in brightness of the object image obtained by the video image producer 1 also changes. It is needless to say that the object Ob may include first and second objects Ob1 and Ob2, as shown in FIG. 12.

In other words, the image contrast F is a function of the distance L and the tilting angle θ, and is expressed by the following equations.

$$F = 1/A \; log_{10} \theta \quad (1),$$

$$A = log_{10} \theta_{max} \quad (2),$$

($\theta_{max}$=90 degrees)
when θ is in the range of about 1 to 90 degrees.

Otherwise, when θ is about 0 degrees, the contrast value is defined by the controller as $$F=0 \quad (1').$$

That is, in the present invention, the contrast F is adjusted to converge upon 0 when θ is nearly equal to 0 degrees, against the theoretical result which is defined in equation (1). Accordingly, when θ is $\theta_{max}$(=90 degrees), the contrast becomes the maximum value 1, and when θ=0, the contrast becomes the minimum value 0.

Furthermore, $$F=BL^2 \quad (3),$$

where $$B=1/(L_{max})^2 \quad (4).$$

$L_{max}$ is established such that the best contrast (i.e. F=1) is obtained when the distance L is at a predetermined maximum $L_{max}$.

Figures 6, 7:
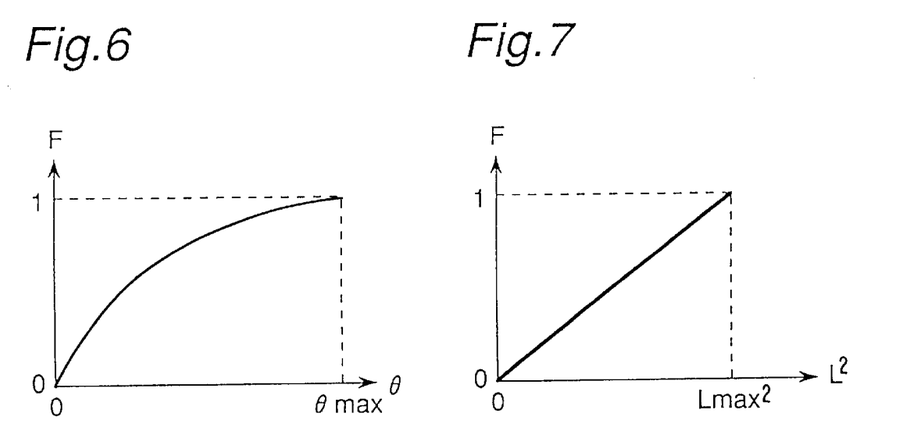
FIG. 6 is a graph showing the image contrast characteristic with respect to the tilting angle of the object.
FIG. 7 is a graph showing the image contrast with respect to a distance between the image sensor and the object.

The image contrast F changes logarithmically when the tilting angle θ changes from 1 toward 90 degrees while the distance is kept constant, as shown in FIG. 6. But, when θ=0, the contrast F=0. Also, the image contrast F changes linearly when the distance L changes from 0 to $L_{max}^2$ while the tilting angle θ is kept constant, as shown in FIG. 7. The variation of image contrast remarkably degrades the accuracy of image density detection by the line window Lw, resulting in the inferior ability to detect the target position.

For detecting or inputting the data indicative information of the tilting angle θ and the distance L, the object condition setter 10 is provided. The object condition setter 10 is, for example, an input/output device such as a keyboard by which the operator can set the values of distance L and tilting angle θ to produce a condition signal So indicative of the condition where the object Ob is placed for the position detection. These values L and θ may be previously determined based on the tolerance or allowance in dimension for the target object or the equipment accuracy. The object condition setter 10 can be replaced by any suitable means for detecting an actual value of the tilting angle θ and distance L at every object Ob to produce the condition signal So.

The filtration coefficient setter 9 is connected to the object condition setter 10 for receiving the condition signal So to determine a coefficient value for each of the detection cells 7a, 7b, 7c, 7d, 7e, 7f, 6, 8a, 8b, 8c, 8d, 8e, and 8f for calibrating the density detection characteristics of the line window Lw according to the object condition. The filtration coefficient setter 9 assigns a coefficient which is a conversion rate within the range of −1 to 1 for each detection cell and produces a coefficient signal Sco indicative of thus assigned coefficients.

The window filter 8 is connected to the filtration coefficient setter 9 for receiving the coefficient signal Sco to set the conversion rate of each of detection cells 7a, 7b, 7c, 7d, 7e, 7f, 6, 8a, 8b, 8c, 8d, 8e, and 8f, which are indicated by the second position signal Sc2, at values respectively assigned by the filtration coefficient setter 9. Then, the window filter 8 produces a detection window signal Sf indicative of the circular detection window Dw and the line detection widow Lw which is calibrated with the filtration coefficients set to each detection cell.

The edge point detector 12 is connected to the approximated position evaluator 11 for receiving the third position signal Sc3 to detect the edge points detected by the line windows Lw, and then produces a fourth position signal Sc4 including the coordinate of thus detected edge points.

The shape detector 13 is connected to the edge point detector 12 for receiving the fourth position signal Sc4 to detect the circular shape of the target image based on the equation of a circle based on the accurate contour point positions thus obtained by the edge point detector 12, and then to obtain the center point of the detected target image.

Figure 2:
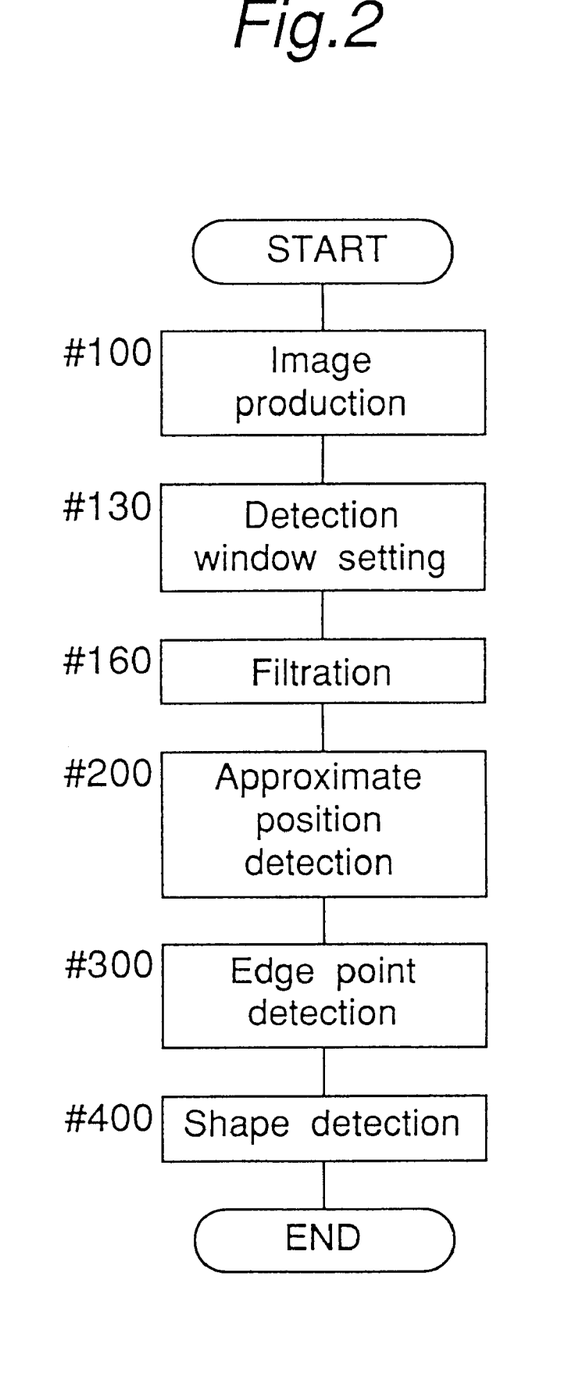
FIG. 2 is a flow chart showing the main routine of the position detection apparatus of FIG. 1.

Referring to FIG. 2, the main routine of operation by the shape detection apparatus of FIG. 1 is shown.

At step #100 titled as "Image production", the image producer 1 captures an image of the object Ob, and outputs the video signal Sv to the image memory 2.

At step #130 titled as "Detection window setting", the detection window Dw with line windows Lw are set by the detection window setter 33 with respect to the first position signal Sc1, and the second position signal Sc2 is output to the window filter 8.

At step #160 titled "Filtration", the filter ability of the line window Lw indicated by the signal Sc2 is set by the window filter 8 based on the coefficient signal Sco, and the detection window signal Sf is output to the approximate position evaluator 11.

At step #200 titled as "approximate position detection", the approximate position of the target image contour is detected. The approximate position evaluator 11 scans the image data Sc1 from the image memory 2 by means of the circular window Dw with the line windows Lw having filtration characteristics set by the window filter 8 so as to detect a position where the circular window Dw matches the shape of the target image, as described above with reference to FIGS. 8, 9, and 10.

The position of the circular window Dw where the number of density difference detection line windows Lw at which the detected image density difference exceeds the threshold value is greatest is determined to be the approximate position of the circular target object. As a result, the third position signal Sc3 is produced. When it is impossible to produce the signal Sc3, The approximate position evaluator 11 outputs an error signal Se from an output terminal 15.

At step #300 titled as "Edge point detection", the edge points are detected by the radial sampling line windows Lw of a predetermined length WL comprised of a predetermined number, thirteen for example in this embodiment, of detection cells, as shown in FIG. 8. The edge point corresponding to the middle cell 6 of each line window Lw is obtained. These edge points are thus detected as the accurate contour point positions. As a result, the fourth position signal Sc4 is produced.

At step #400 titled as "shape detection", the approximate shape of the target object is detected based on the detected edge points (fourth position signal Sc4). The center coordinates of the circle are then obtained based on the equation of a circle, and the peak of a frequency distribution of these center coordinates is detected as the true center point of the target image.

It is to be noted that the operation described above with respect to the routines #130, #160, #200, #300, and #400 may be performed by means of a software programmed in a micro computer.

Figure 4:
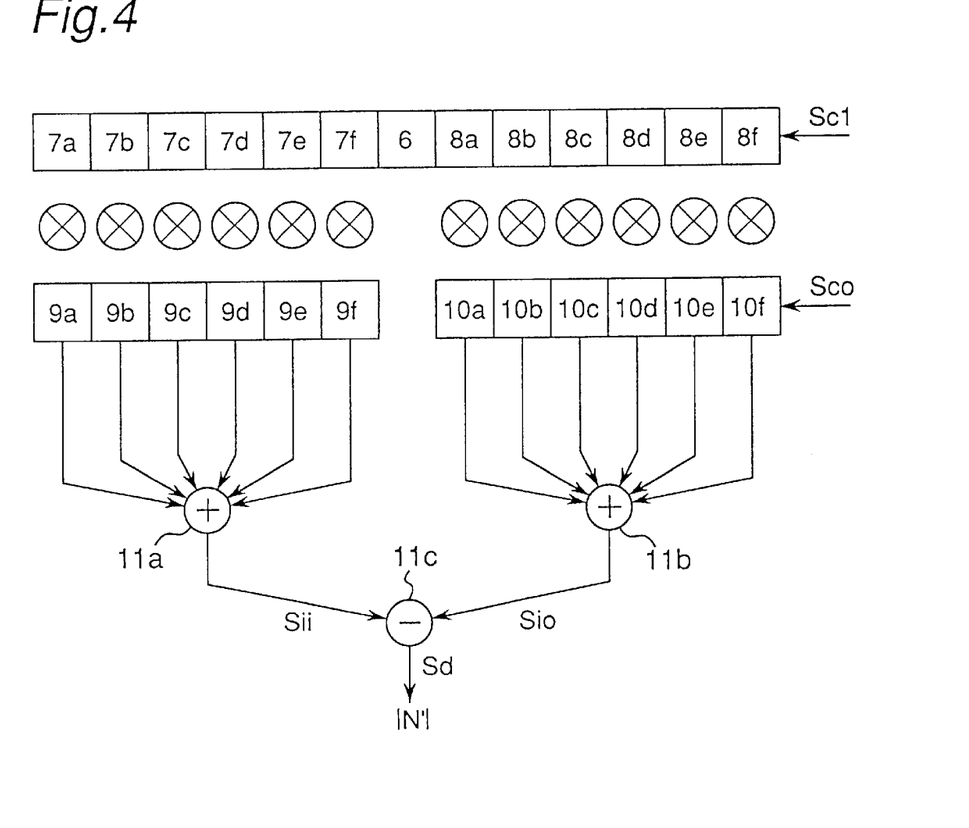
FIG. 4 is an illustration in assistance of explaining the window filter of FIG. 1.

Reference to FIG. 4, the window filter 8 is schematically shown. The window filter 8 has calibration cells 9a, 9b, 9c, 9d, 9e, 9f, 10a, 10b, 10c, 10d, 10e, and 10f corresponding to the density detection cells 7a, 7b, 7c, 7d, 7e, 7f, 8a, 8b, 8c, 8d, 8e, and 8f of the line window Lw. Each of calibration cells is set to a suitable calibration coefficient or conversion rate determined according to the coefficient signal Sco. Each of calibration cells converts the image signal Scd detected by the corresponding detection cell to have a density level determined by the calibration coefficient set thereto.

A first adder 11a is provided for receiving the image signal Sc1 coming from the inside detection 7a, 7b, 7c, 7d, 7e, and 7f through cells 9a, 9b, 9c, 9d, 9e, and 9f, where the density level is calibrated. Then, an inside calibrated signal Sii having a density level equal to a sum of those received signals is produced.

A second adder 11b is provided for receiving the image signal Sc1 coming from the outside detection 8a, 8b, 8c, 8d, 8e, and 8f through cells 10a, 10b, 10c, 10d, 10e, and 10f, where the density level is calibrated. Then, an outside calibrated signal Sio having a density level equal to a sum of received signals is produced.

An subtractor 11c is provided for producing a difference signal Sd by subtracting one of signals Sii and Sio, for example signal Sii, from the other signal. The difference signal Sd has a density level N' equal to the difference in density or brightness in those signals Sii and Sio. Note that the image signal data passing through calibration cells construct the image signal Sc1 having density which is calibrated according to the signal Sco. This calibrated image signal Sc1 is hereafter referred to as "a calibrated image signal Sc1'". The density level N' is the brightness band of the calibrated image signal Sc1'. According to an absolute value of this calibrated brightness band N', the counter line or edge point of the target image is detected.

Figure 11:
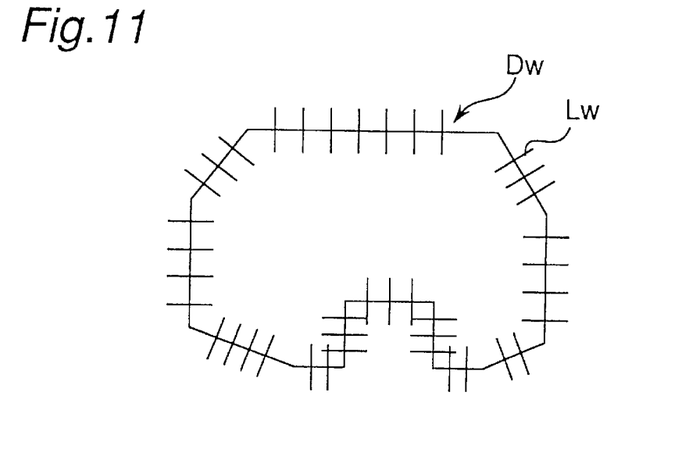
FIG. 11 is an illustration in assistance of explaining a free-shape polygonal window according to the present invention.

Although the method for detecting the target image having a circular shape is described above, it is also possible to detect the true center point of a target image even when the target image is a non-circular image of any shape such a polygonal shape, for example, as shown in FIG. 11.

Figure 3:
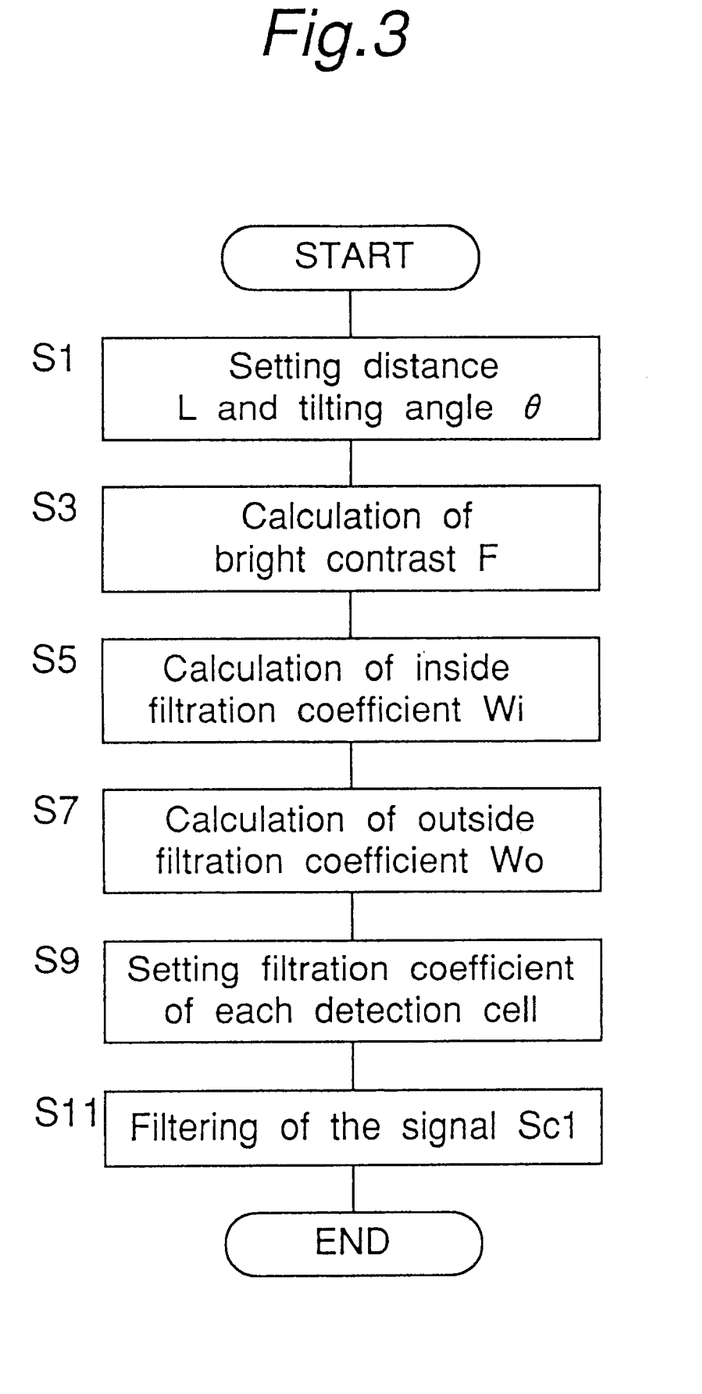
FIG. 3 is a flow chart showing the operation for the filtration routine of FIG. 2.

Referring to FIG. 3, a flow chart for the filtration operation by the line window Lw performed at step #160 of FIG. 2 is shown.

At step S1, the values of distance L and tilting angle θ indicative of the object condition are set by the object condition setter 10.

At step S3, the contrast F in the image obtained by the video image producer 1 is calculated based on the distance L and tilting angle θ set at step S1 in accordance with the following function of $$F=K(\theta,L) \tag{5}$$

where "K" is determined experimentally. It is to be noted that the function (5) is derived from the equations (1) and (3).

At step S5, a filtration coefficient Wi for the detection cells 7a, 7b, 7c, 7d, 7e, and 7f of line window Lw inside the detection window Dw is calculated in accordance with the following equation of $$Wi=Ni(F-1) \tag{6}$$

where "Ni" is a reference coefficient for the detection cells inside the detection window Dw, and is usually set to 1. The inside coefficient Wi falls within a range of −1 to 0.

At step S7, a filtration coefficient Wo for the detection cells 8a, 8b, 8c, 8d, 8e, and 8f of line window Lw is calculated in accordance with the following equation of $$Wo=No.(1-F) \tag{7}$$

where "No" is a reference coefficient for the detection cells outside the detection window Dw, and is usually set to 1. The outside coefficient Wo falls within a range of 0 to +1. Thus, when F=0, both Wi and Wo are not 0.

At step S9, a filtration coefficient for each of detection cells 7a, 7b, 7c, 7d, 7e, 7f, 8a, 8b, 8c, 8d, 8e, and 8f is suitably set according to the values of filtration coefficients Wi and Wo. For example, the coefficient for each of inside cells 7a, 7b, 7c, 7d, 7e, 7f is set to any value within the range of Wi and 0, and the coefficient for each of inside cells 8a, 8b, 8c, 8d, 8e, and 8f is set to any value within the range of 0 and Wo. In other words, calibration cells 9a, 9b, 9c, 9d, 9e, 9f, 10a, 10b, 10c, 10d, 10e, and 10f described before with reference to FIG. 4 are formed.

At step S11, the brightness in a pixel corresponding to each of density detection cells 7a, 7b, 7c, 7d, 7e, 7f, 8a, 8b, 8c, 8d, 8e, and 8f is increased or decreased according to the filtration coefficient set thereto by the calibration cells. As a result, the signal Sc1 is filtered according to the filtration coefficients determined in accordance with the object condition, and the filtered signal Sc1' is produced.

The details of the filtration operation performed at this step are described below with reference to FIG. 5. When the image contrast F in the image data Sc1 is small in the areas inside and outside with respect to the object's contour line, a brightness band which is a brightness difference N between those inside and outside areas may be smaller than a minimum brightness difference $N_{TH}$. This minimum brightness difference $N_{TH}$ is a threshold for the edge point detection according to the image recognition method to distinguish the boundary between those two areas.

Figure 5:
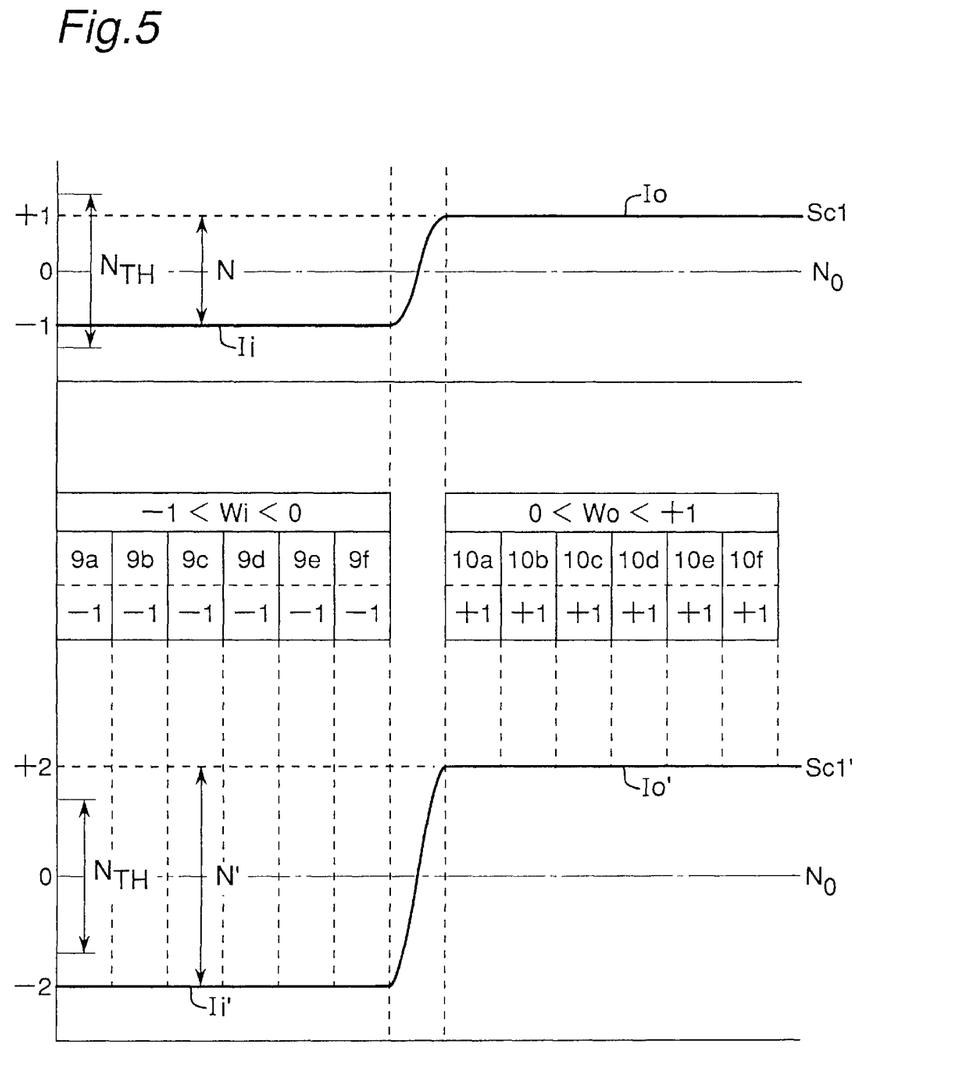
FIG. 5 is an illustration in assistance of explaining the operation of the window filter of FIG. 4.

In FIG. 5, the image signal Sc1 obtained with respect to the target which is a hole sank from the surface of the object Ob and is illuminated from the front side or the side of video image producer 1. In this case, the image inside the target hole is brighter than the image outside the target hole. For example, the outside density Io of image signal Sc1 has a greater density such as +1 and the inside density Ii has a smaller density such as −1 with respect to a standard density level $N_0$. As a result, the brightness difference N of this image signal Sc1 is 2, and is smaller than the minimum brightness difference $N_{TH}$. Although, in this example, the absolute level values of both the inside and outside densities Ii and Io are the same, but they can be different.

By filtering the image signal Sc1 having such a narrow brightness band N with the line windows Lw having cells calibrated in a manner described above, the inside and outside image densities Ii and Io are elevated and lowered, respectively, by a level of 1. As a result, a calibrated signal Sc1' having an inside density Ii' at a level −2 and an outside density Io' at a level +2 is obtained. This resulted signal Sc1' has a brightness band N' which is twice as wide as that of the original image signal Sc1 and greater than the threshold brightness $N_{TH}$.

Note that the inside density Ii is greater than the outside density Io when the target is raised from the surface of the object illuminated from the front side, and even when the hole formed in the object made by a transparent material is illuminated from the back side or the bottom side of the object. In these cases, the filtration coefficients Wi and Wo are determined such that the inside density Ii is elevated and the outside density Io is lowered to widen the brightness band of the image signal Sc1.

A detail of the equipment for the approximate position detection as well as the edge detection, is disclosed in U.S. patent application Ser. No. 08/374,202 entitled "Shape detection apparatus" by Yoshihiro Itsuzaki, Masatoshi Nakamura, Noriyuki Suzuki, Misuzu Takano, and Kenji Horikami filed Jan. 18, 1995 and assigned to the same assignee as the present application.

A position detection apparatus according to the present invention widens the brightness band of the target image whose bright contrast is too small to recognize a boundary in the target image by applying a filtration to the image signal before edge point detection. As a result, the position of the target object can be correctly detected even if the object is under a bad condition for the detection utilizing the image recognition method.

Although the present invention has been fully described in connection with the preferred embodiment thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A position detection apparatus for detecting a position of an object, said apparatus comprising:

an image signal producing means for optically capturing an image of said object and producing an image signal indicative of an image of said object, said image signal having an edge point by which said image signal is divided into first and second level portions having a level difference therebetween;

an edge point detecting means for detecting said edge point where said level difference is greater than a predetermined level;

an enhancing means for enhancing said image signal by increasing said level difference to a value greater than said predetermined level so that said edge point detecting means can detect said edge point even when said level difference is smaller than said predetermined level;

a position detecting means for detecting the position of said object based on said detected edge point;

an enhancing signal producing means for producing an enhancing signal having a first enhancing portion for lowering said first level portion by a first predetermined enhancing level Wi and a second enhancing portion for elevating said second level portion by a second predetermined enhancing level Wo;

an enhancing level determining means for determining said first and second enhancing determining levels based on an image contrast F in said image signal;

an image contrast detection means for detecting said image contrast based on object conditions where said object is placed with respect to said image signal producing means;

wherein, said object conditions are a distance L between said object and said image signal producing means and an angle θ of said object with respect to an optical axis of said image signal producing means;

said image contrast F, said distance L, and said angle θ have a relationship expressed by a function of $$F=K(\theta,L),$$

where K is suitably determined with respect to said object; and said first predetermined enhancing level Wi and said image contrast F have a relationship expressed by an equation of $$Wi=Ni\times(F-1),$$

where Ni is a reference coefficient suitably determined with respect to said first enhancing portion.

2. A position detection apparatus for detecting a position of an object, said apparatus comprising:

an image signal producing means for optically capturing an image of said object and producing an image signal indicative of an image of said object, said image signal having an edge point by which said image signal is divided into first and second level portions having a level difference therebetween;

an edge point detecting means for detecting said edge point where said level difference is greater than a predetermined level;

an enhancing means for enhancing said image signal by increasing said level difference to a value greater than said predetermined level so that said edge point detecting means can detect said edge point even when said level difference is smaller than said predetermined level;

a position detecting means for detecting the position of said object based on said detected edge point;

an enhancing signal producing means for producing an enhancing signal having a first enhancing portion for lowering said first level portion by a first predetermined enhancing level Wi and a second enhancing portion for elevating said second level portion by a second predetermined enhancing level Wo;

an enhancing level determining means for determining said first and second enhancing determining levels based on an image contrast F in said image signal;

an image contrast detection means for detecting said image contrast based on object conditions where said object is placed with respect to said image signal producing means;

wherein,
said object conditions are a distance L between said object and said image signal producing means and an angle θ of said object with respect to an optical axis of said image signal producing means;
said image contrast F, said distance L, and said angle θ have a relationship expressed by a function of $$F=K(\theta,L)$$

where K is suitably determined with respect to said object; and said second predetermined enhancing level Wo and said image contrast F have a relationship expressed by an equation of $$Wo=No \times (1-F),$$

where No is a reference coefficient suitably determined with respect to said second enhancing portion.

3. A position detection apparatus as claimed in claim 1, wherein said second predetermined enhancing level Wo and said image contrast F have a relationship expressed by an equation of $$Wo=No \times (1-F),$$

where No is a reference coefficient suitably determined with respect to said second enhancing portion.

* * * * *

UNITED STATES PATENT AND TRADEMARK OFFICE
CERTIFICATE OF CORRECTION

PATENT NO. : 5,930,406
DATED : July 27, 1999
INVENTOR(S) : Yoshihiro ITSUZAKI et al.

It is certified that error appears in the above-identified patent and that said Letters Patent is hereby corrected as shown below:

ON THE TITLE PAGE:

In the Assignee, change "Matsushita Electric Insustrial Co., Ltd." to --Matsushita Electric Industrial Co., Ltd.--.

Signed and Sealed this

Twenty-first Day of November, 2000

*Attest:*

Q. TODD DICKINSON

*Attesting Officer*     *Director of Patents and Trademarks*